United States Patent [19]

Gilson

[11] Patent Number: 4,593,888
[45] Date of Patent: Jun. 10, 1986

[54] ADJUSTABLE PATTERN

[76] Inventor: Robert L. Gilson, 3420 Hickory Ridge, Edmond, Okla. 73034

[21] Appl. No.: 729,307

[22] Filed: May 1, 1985

[51] Int. Cl.$^4$ .............................................. B23K 7/10
[52] U.S. Cl. ....................................................... 266/70
[58] Field of Search .................................... 266/70, 58

[56] References Cited

U.S. PATENT DOCUMENTS

| | | | |
|---|---|---|---|
| 1,470,168 | 10/1923 | Jepsen | 266/70 |
| 1,853,026 | 4/1932 | Anderson . | |
| 2,388,376 | 11/1945 | Young | 33/27 |
| 2,390,938 | 12/1945 | Hubbell | 33/27 |
| 2,411,182 | 11/1946 | Anderson | 33/27 |
| 2,468,938 | 5/1949 | McLauchlan | 266/70 |
| 2,469,112 | 5/1949 | Helwig | 266/70 |
| 2,483,229 | 9/1949 | Parker | 266/23 |
| 2,499,938 | 3/1950 | Ward | 266/23 |
| 2,851,264 | 9/1958 | Bryant | 266/23 |
| 3,417,477 | 12/1968 | Nowotny | 33/174 |
| 4,411,410 | 10/1983 | Sumner | 266/70 |

OTHER PUBLICATIONS

Victor Equipment Co. Catalog sheet, DC 2400 Duplicutter.

Primary Examiner—Wayland Stallard
Attorney, Agent, or Firm—Dunlap, Codding & Peterson

[57] ABSTRACT

An adjustable pattern adapted to be utilized with a cutting machine having a drive motor with a drive motor output shaft and a cutting element associated with the drive motor so the cutting element follows a cutting path generally following movement of the drive motor. The adjustable pattern includes a base pattern having a surface defining a pattern path which is connectable to the cutting machine; a first drive post having a drive end connectable to the drive motor of the cutting machine; a second drive post; means for movably connecting the second drive post to the surface of the base pattern defining the pattern path so the second drive post moves along the pattern path as the second drive post is rotated; means connecting the first and the second drive posts so that rotational movement of the first drive post rotatingly drives the second drive post; and means for selectively varying the distance between the first drive post and the center of the base pattern thereby selectively varying the cutting path defined by the movement of the first drive post as the second drive post moves along the pattern path.

13 Claims, 5 Drawing Figures

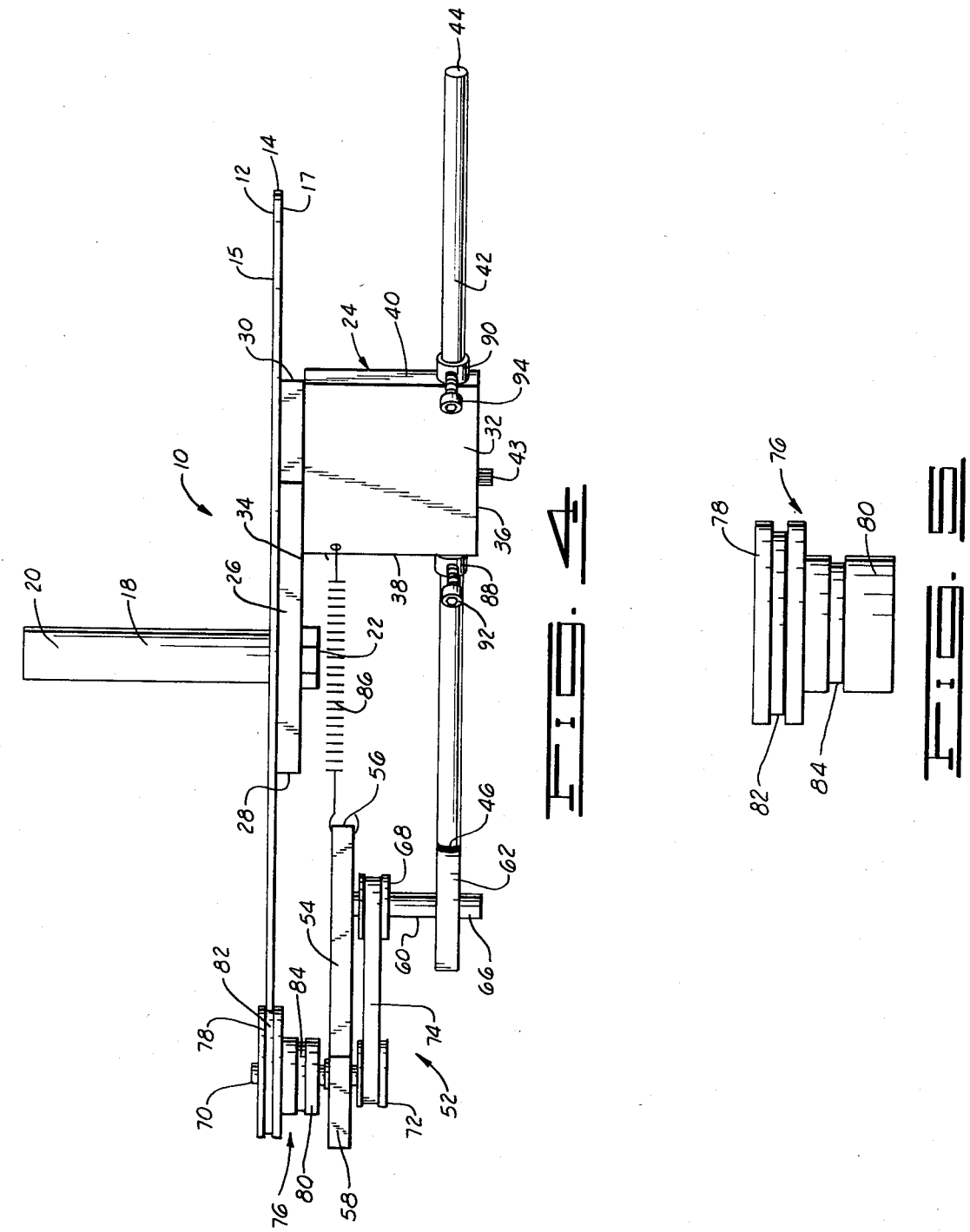

ADJUSTABLE PATTERN

BACKGROUND OF THE INVENTION

Field of the Invention

The present invention relates generally to patterns for cutting machines and, more particularly, to an adjustable pattern for cutting circles of varying, predetermined diameters utilizing existing drive motors on existing cutting machines.

BRIEF DESCRIPTION OF THE DRAWINGS

FIG. 4 is a side elevational view of the adjustable pattern of FIGS. 1, 2, and 3.

FIG. 5 is a side elevational view of the first and the second drive rings of the adjustable pattern of FIGS. 1, 2, 3, and 4.

DESCRIPTION OF THE PREFERRED EMBODIMENTS

Figure 1:
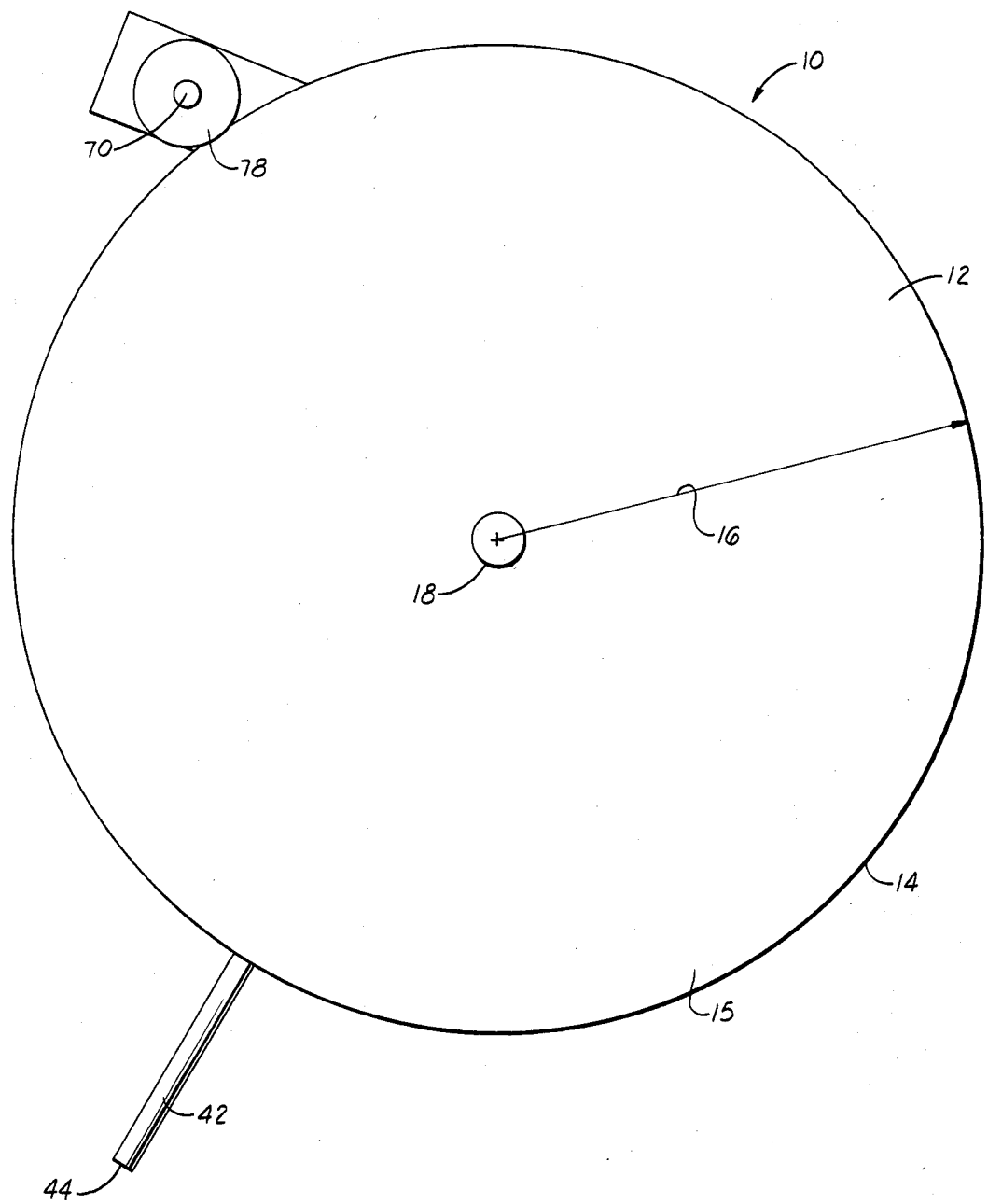
FIG. 1 is an upper surface plan view of an adjustable pattern which is constructed in accordance with the present invention.

There are commercially available shape cutting machines which include a cutting torch mounted for selectively moving along various selected cutting paths and a torch drive. The torch drive includes a drive motor having a knurled knob affixed to the drive motor output shaft. In operation, a pattern such as a circularly shaped pattern is mounted on the cutting machine so the knurled knob abuts the outer peripheral surface of the pattern, and the drive motor and the cutting torch are mounted as an assembly so the cutting torch position follows the drive motor position. As the drive motor rotatingly drives the knurled knob, the knurled knob (typically of a magnetic construction) engages the outer peripheral surface of the pattern thereby driving the drive motor and the cutting torch associated therewith along the cutting path defined by the outer peripheral surface of the pattern. One cutting machine of the type generally described before is commercially available from Victor Equipment Company in Denton, Tex.

With such prior art cutting machines, if it was desired to cut a circle of a different diameter as opposed to the diameter of the pattern which then was on the cutting machine, a different pattern having the desired new diameter had to be constructed and assembled to the machine. Thus, a different pattern had to be constructed for each diameter circle desired to be cut utilizing such prior art cutting machines, and then it was necessary to remove a pattern from such cutting machine and assemble the new, different desired diameter pattern to such cutting machine when the desired diameter changed because of some job requirement.

As shown in FIGS. 1, 2, 3, and 4, the present invention consists of an adjustable pattern 10 which is mountable on a cutting machine of the type generally described before and which allows the operator to cut circles of different, preselected diameters without removing and reassembling different patterns as was required in the past. In general, the adjustable pattern includes a solid, circularly shaped base pattern 12 having an outer peripheral surface 14 which is formed on a predetermined radius 16, and an upper surface 15 and a lower surface 17.

One end of a support post 18 (FIGS. 1 and 4) is secured to a central portion of the base pattern 12 and the support post 18 extends a distance generally perpendicularly from the base pattern 12 terminating with a connecting end 20 portion (shown in FIG. 4). More particularly, a threaded end portion, opposite the connecting end portion 20, of the support post 18 extends through an opening (not shown) in a central portion of the base pattern 12 and a nut 22 is threadedly secured to the end of the support post 18, the nut 22 threadedly engaging the support post 18 and engaging a portion of the base pattern 12 to secure the support post 18 in an upright position connected to the base pattern 12.

A support base assembly 24 (shown in FIGS. 2, 3, and 4) also is secured to the lower surface 17 of the base pattern 12. More particularly, the support base assembly 24 includes a base plate 26 having opposite ends 28 and 30. The threaded end portion of the support post 18, not only extends through a central portion of the base pattern 12, but, also, the threaded end portion of the support post 18 extends through an opening (not shown) in the base plate 26 generally near the end 28 thereof and the nut 22, more particularly, engages the base plate 26 to attach the base plate 26 to the lower surface 17 of the base pattern 12, the base plate 26 being connected to the support post 18 by a bearing 27 so the base plate 26 is bearingly connected to the support post 18.

The support base assembly 24 also includes a support base 32 having opposite ends 34 and 36 (shown in FIG. 4. The end 34 of the support base 32 is secured to the base plate 26 and the support base 32 extends a distance from the base plate 26 terminating with the opposite end 36 of the support base 32. In one form, the support base 32 is generally rectangularly shaped and also includes opposite sides 38 and 40 (shown in FIG. 4). The base plate 26 is secured to a central portion of the base pattern 12 by the support post 18 and cooperating nut 22 and the base plate 26 extends a distance radially from the central portion of the base pattern 12 terminating with the opposite end 30 of the base plate 26. Since the support base 32 is supported or connected to the base 26 generally near the end 30 of the base plate 26, the support base 32 is spaced a distance radially from the central portion of the base pattern 12. Also, it should be noted that the base plate 26 is journally connected to the support post 18 so that the base plate 26 can be rotated about the support post 18, during the operation of the adjustable pattern 10 in a manner and for reasons to be described in greater detail below. The base plate 26 and the support base 32 cooperate to form a rod support portion of the support base assembly 24.

An opening (not shown) extends through the support base 32 generally near the end 36 of the support base 32 and the opening (not shown) intersects the opposite sides 38 and 40 of the support base 32. The opening (not shown) in the support base 32 is sized to slidingly receive an adjust rod 42. The adjust rod 42 has opposite ends 44 and 46 and the adjust rod 42 is slidingly disposed in the opening (not shown) in the support base 32 for sliding movement in one direction 48 and in an opposite direction 50 (shown in FIGS. 2 and 3). The support base assembly 24 is positioned so the adjust rod 42 extends diametrically across the base pattern 12, the adjust rod 42 extending through the center of the base pattern 12. The adjust rod 42 is fixed in a preselected position within the support base 32 by a set screw 43 (shown in FIGS. 2, 3, and 4).

The support base assembly 24 (shown in FIGS. 2, 3, and 4) also includes a pattern drive assembly 52 which is connected to the end 46 of the adjust rod 42. The pattern drive assembly 52 is connectable to the output shaft of the drive motor associated with the cutting torch of the cutting machine and the pattern drive assembly 52 also is movably connectable to the outer peripheral surface 14 of the base pattern 12 so that the portion of the pattern drive assembly 52 movably connected to the outer peripheral surface 14 of the base pattern 12 is driven along the pattern path defined by the outer peripheral surface 14 of the base pattern 12 while the torch is driven along a different cutting path during the operation of the adjustable pattern 10.

The pattern drive assembly 52 includes a bar 54 having opposite ends 56 and 58. One end of a first drive post 60 is secured to the bar 54, generally near the end 56 thereof and the first drive post 60 extends a distance generally perpendicularly from the bar 54. A ring 62 is disposed generally on the end of the first drive post 60, generally opposite the end of the first drive post 60 which is connected to the bar 54, the first drive post 60 extending generally through a central portion of the ring 62. More particularly, a bearing 64 (shown in FIGS. 2 and 3) is secured in a central opening of the ring 62 and the first drive post 60 extends through the bearing 64 so that the bearing 64 is bearingly connected to the first drive post 60. The end 46 of the adjust rod 42 is secured (such as by welding, for example) to the outer peripheral surface of the ring 62 and, since the adjust rod 42 is supported a distance from the lower surface 17 of the base pattern 12, the adjust rod 42 cooperates to support the ring 62 on the first drive post 60 a distance below the lower surface 17 of the base pattern 12. The first drive post 60 extends through the ring 62 and extends a distance beyond the ring 62 forming a drive end 66 portion of the first drive post 60.

The first drive post 60 also extends through a central portion of a first drive pulley 68 (shown in FIG. 4) and the first drive pulley 68 is secured to the first drive post 60 (such as by set screw, for example). The first drive pulley 68 is positioned generally between the bar 54 and the ring 62. Since the first drive pulley 68 is secured to the first drive post 60, the rotational movement of the first drive post 60 during the operation of the adjustable pattern 10 results in drivingly rotating the first drive pulley 68, for reasons to be made more apparent below.

The pattern drive assembly 52 includes a second drive post 70 which extends through the bar 54 generally near the end 58 of the bar 54 (the end 58 of the bar 54 generally opposite the end 56 of the bar 54 having the first drive post 60 connected thereto). One end of the second drive post 70 extends through the bar 54 and extends a distance beyond the bar 54 generally on the same side of the bar 54 with respect to the disposition of the first drive pulley 68. A second drive pulley 72 (shown in FIG. 4) is secured to the end of the second drive post 70 generally on the same side of the bar 54 with respect to the disposition of the first drive pulley 68 so that the first and the second drive pulleys 68 and 72 generally are aligned and disposed on the same side of the bar 54. It should be noted that the pulleys 68 and 72 could be located on the opposite side of the bar 54 with respect to the disposition shown in the drawings, if desired, and the pulleys 68 and 72 could be gears, if so desired.

A drive belt 74 (shown in FIG. 4) extends between the first and the second drive pulleys 68 and 72 and the drive belt 74 is drivingly connected to the first and the second drive pulleys 68 and 72 so that rotation of the first drive pulley 68 results in the rotation of the second drive pulley 72 during the operation of the adjustable pattern 10. A bearing is disposed in the opening (not shown) in the end 58 of the bar 54 and the second drive post 70, more particularly, extends through the bearing (not shown) in the bar 54 so that the second drive post 70 is bearingly connected to the bar 54.

The second drive post 70 extends a distance beyond the side of the bar 54, generally opposite the side of the bar 54 having the first and the second drive pulleys 68 and 70 disposed thereon and the second drive post 70 extends a distance beyond the bar 54 to a position generally near the outer peripheral surface 14 of the base pattern 12.

A drive ring assembly 76 (shown in FIGS. 4 and 5) is secured to the end of the second drive post 70, generally opposite the end of the second drive post 70 having the second drive pulley 72 disposed thereon. The drive assembly 76, more particularly, includes a first drive ring 78 having a predetermined diameter and a second drive ring 80 having a predetermined diameter with the diameter of the second drive ring 80 being smaller than the diameter of the first drive ring 78. The first drive ring 78 includes a groove 82 formed in and extending about the outer peripheral surface of the first drive ring 78 and the groove 82 is sized to engage the outer peripheral surface 14 of the base pattern 12, the outer peripheral surface 14 portion of the base pattern 12 generally being diposed within the groove 82 of the first drive ring 78 when the first drive ring 78 is positioned in driving engagement with the outer peripheral surface 14 of the base pattern 12. The second drive ring 80 also includes a groove 84 formed about the outer peripheral surface of the second drive ring 80 and the groove 84 is sized to engage the outer peripheral surface 14 of the base pattern 12, the outer peripheral surface 14 portion of the base pattern 12 generally being disposed within the groove 84 of the second drive ring 80 when the second drive ring 80 is positioned in driving engagement with the outer peripheral surface 14 of the base pattern 12.

One end of a spring 86 is secured to the end 58 portion of the bar 54 and the opposite end of the spring 86 is secured to a portion of the support base 32. The spring 86 biases the pattern drive assembly 52 in a direction to bias either the first drive ring 78 or the second drive ring 80 in a direction generally toward engagement with the outer peripheral surface 14 of the base pattern 12, the spring 86 cooperating to bias either the first or the second drive rings 78 or 80 into driving engagement with the outer peripheral surface 14 of the base pattern 12 so the drive ring 78 or 80 rotates along the outer peripheral surface 14 during the operation of the adjustable pattern 10.

The spring 86 could be replaced with a torsional spring connected between the adjust rod 42 and the bar 54, for example. In one other embodiment, the drive rings 78 and 80 could be of a magnetic construction and the spring 86 could be eliminated, if desired, in this embodiment.

In one other embodiment, the drive rings 78 and 80 can be positionable for engagement with the inner peripheral surface of a belt which extends about the outer peripheral surface 14 of the base pattern 12 and which has a diameter larger than the diameter of the base pattern 12. In this embodiment, the drive rings 78 and 80 would not engage the outer peripheral surface 14 and the rings 78 and 80 would be biased by a spring into engagement with the inner peripheral surface of the belt. The rings 78 and 80 would follow a pattern path having a diameter larger than the diameter of the base pattern 12.

The adjustable pattern 10 also includes two stop rings, a first stop ring 88 and a second stop ring 90. Each stop ring 88 and 90 has an opening (not shown) extending therethrough and the opening in each of the stop rings 88 and 90 is sized to slidingly receive the adjust rod 42. A set screw 92 extends through the outer peripheral surface of the first stop ring 88 and the set screw 92 extends a distance through the first stop ring 88 intersecting the opening through the first stop ring 88. A set screw 94 extends through the outer peripheral surface of the second stop ring 90 and the set screw 94 extends a distance through the second stop ring 90 intersecting the opening through the second stop ring 90.

In operation, the adjustable pattern 10 is mounted on a commercially available cutting machine of the type generally described before by connecting the end of the support post 18, opposite the end of the support post 18 which is connected to the base pattern 12, to the frame portion of the cutting machine, thereby positioning the adjustable pattern 10 in a predetermined position on the cutting machine. If the cutting machine is of the type which has a knurled knob connected to the output shaft of the drive motor, the knurled knob is removed and the drive end portion 66 of the first drive post 60 is connected to the drive motor output shaft in place of the knurled knob. In any event, the drive end portion 66 of the first drive post 60 is connected to the drive motor output shaft of the cutting machine. Prior to assembling the adjustable pattern 10 to the cutting machine, the adjust rod 42 is moved in the opening (not shown) in one of the directions 48 or 50 to position the adjust rod 42 so that the cutting path diameter is of a predetermined length and either the first drive ring 78 or the second drive ring 80 is positioned in driving engagement with the outer peripheral surface 14 of the base pattern 12.

After the adjustable pattern 10 has been positioned in the manner just described on the cutting machine, the cutting machine is operated so that the cutting machine drive motor rotatingly drives the first drive post 60 during the cutting operation. When the first drive post 60 is rotatingly driven by the cutting machine drive motor, the first drive pulley 68 also will be rotatingly driven, thereby rotatingly driving the second drive pulley 72 by virtue of the driving engagement between the first and the second drive pulleys 68 and 72 provided by the drive belt 74. The driving rotation of the first drive post 60 thus rotatingly drives the second drive post 70.

Assuming the first drive ring 78 has been positioned in driving engagement with the outer peripheral surface 14 of the base pattern 12, as shown in the drawings, the driving rotation of the second drive post 70 results in the driving rotation of the first drive ring 78. Thus, the cutting machine drive motor rotatingly drives the first drive ring 78 thereby drivingly moving the first drive ring 78 along a pattern path generally about the outer peripheral surface 14 of the base pattern 12. As the first drive ring 78 is thus drivingly moved along the pattern path about the outer peripheral surface 14 of the base pattern 12, the cutting machine drive motor and the cutting machine drive torch connected thereto will be moved along a cutting path defined by the position of the first drive post 60.

Figure 2:
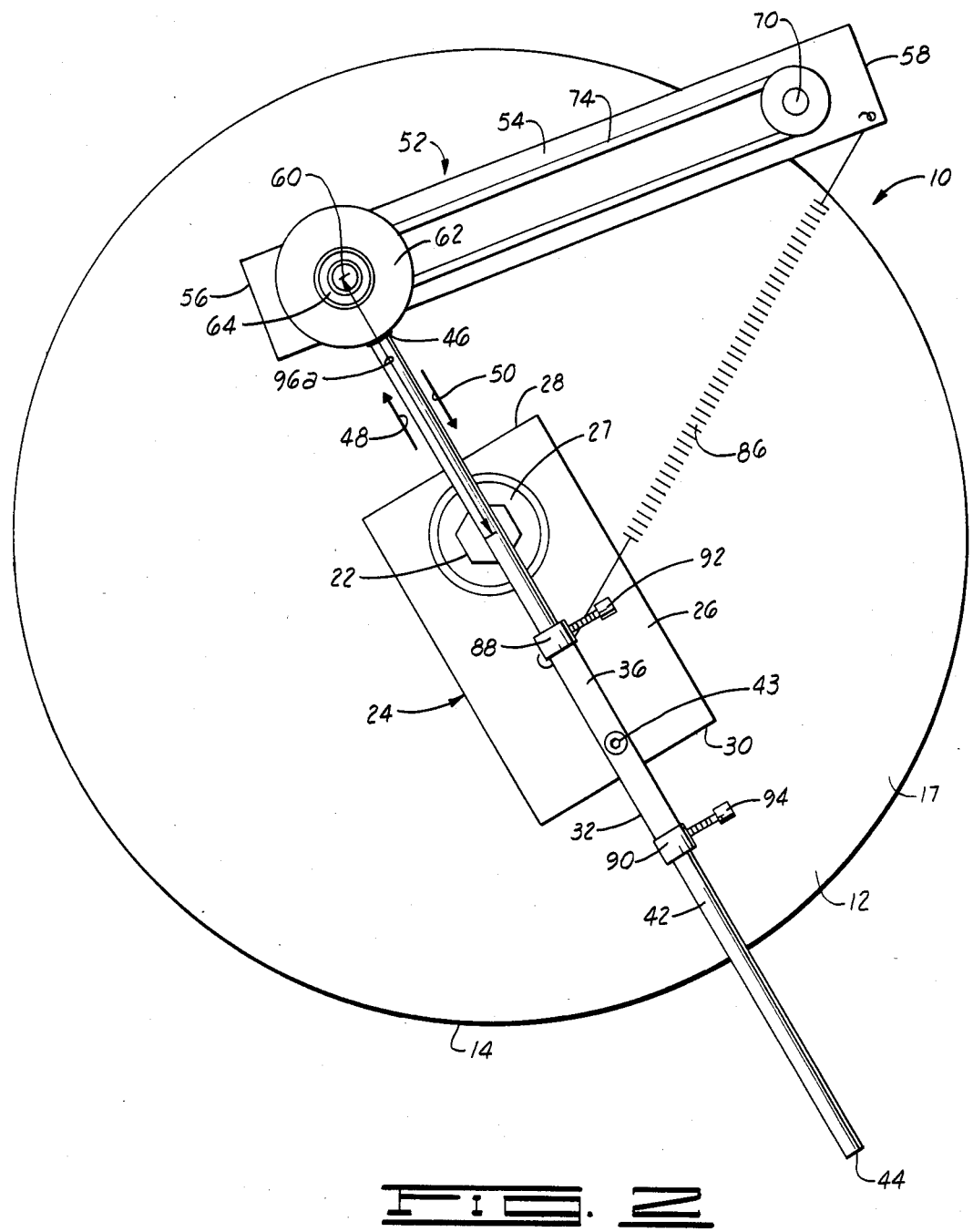
FIG. 2 is a lower surface plane view of the adjustable pattern of FIG. 1 with the adjust rod prepositioned in one position for defining one predetermined cutting path diameter.
Figure 3:
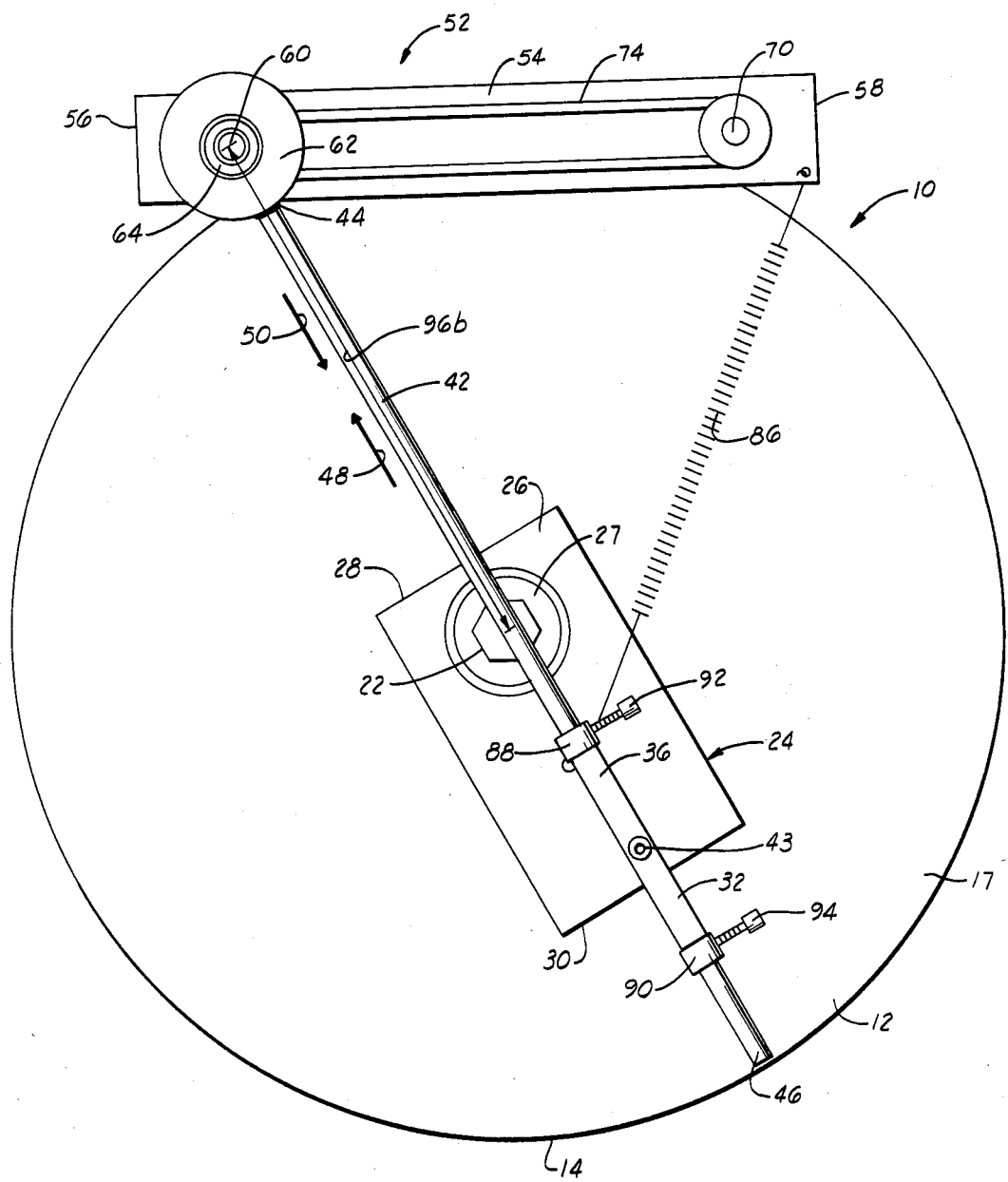
FIG. 3 is a lower surface plan view of the adjustable pattern of FIGS. 1 and 2, similar to FIG. 2 but showing the adjust rod in a different position for defining a cutting path diameter different than the cutting path diameter defined by the position of the adjust rod shown in FIG. 2.

The cutting path defined by the positions of the first drive post 60 will be circularly shaped. The pattern path diameter is set and predetermined by the diameter of the base pattern 12 defined by the diameter formed by the outer peripheral surface 14 of the base pattern 12; however, the cutting path diameter is defined by a distance 96 (shown in FIGS. 2 and 3) between the center of the base pattern 12 and the center of the first drive post 60. The distance 96 between the center of the base pattern 12 and the center of the first drive post 60 is adjustable by moving the rod 42 in the directions 48 and 50 within the support base 32 thereby varying or adjusting the distance 96. By moving the adjust rod 42 in the directions 48 or 50 within the support base 32, the distance 96 can be varied and thus the diameter of the cutting path can be varied. In FIG. 2, the adjust rod 42 is shown moved to one position setting the distance 96a and, in FIG. 3, the adjust rod 42 is shown moved to a different position setting the distance 96b, the distance 96b being shown as being larger than the distance 96a.

Once the adjust rod 42 has been moved in the directions 48 or 50 within the support base 32 to a position providing a predetermined or preset distance 96 thereby providing a desired diameter cutting path, the adjust rod 42 can be secured in that position within the support base 32 by tightening the set screw 42.

The stop rings 88 and 90 are adjustable stops to be used to move the adjust rod 42 to preset positions defined by the positions of the stop rings 88 and 90 on the adjust rod 42 which are particularly useful when cutting inside or outside circle shapes.

Thus, utilizing the adjustable pattern 10 of the present invention, the diameter of the cutting path can be varied by moving the adjust rod 42 to varyingly adjust the distance 96 or, in other words, to varyingly adjust the diameter of the cutting path without the necessity of removing the adjustable pattern from the cutting machine.

It should be noted that the adjust rod 42 could be connected to the bar 54 in lieu of the connection of the adjust rod 42 to the ring 62. In this embodiment (not shown) the distance from the center of the base pattern 12 to the connection of the adjust rod 42 to the bar 54 would be related to the diameter of the circle to be cut; however, the relationship is not as direct as with the embodiment of the invention shown in the drawings.

When cutting steel having varying thicknesses (⅛ inch to 6 inches, for example), the drive motor speed is varied. The first drive ring 78 would be preferrably utilized when the cutting torch is moving along a path such that the circle it describes is much smaller than the diameter of the base pattern 12, and the second drive ring 80, having the smaller diameter, would be preferrably utilized when the cutting torch is moving along a path such that the circle it describes is much larger than the diameter of the base pattern 12. The drive ring assembly 76 could include more than the two drive rings, if desired in a particular application.

In one other embodiment (not shown), the support post 18 can be connected to the output of a gear reduction unit and the support post 18 then would be supported in a fixed position so the gear reduction unit is rotatably supported on the support post 18. The adjust rod 42 is slidably disposed through the reduction gear box in a manner similar to the support base 32, and one end of the adjsut rod 42 is affixed to the ring 62 in a manner like that described before. In this embodiment, the drive rings 78 and 80 would be replaced by a pulley and a belt would be connected about such pulley and about the input shaft of the gear reduction unit. The existing drive motor output shaft on the cutting machine would be connectable to the drive end 66 of the first drive post 60 in a manner like that described before. In this embodiment, a base pattern such as the base pattern 12 can be eliminated. The gear reduction unit is utilized to adjust the speed so the cutting torch is driven at a slower speed.

Changes may be made in the construction and the operation of the various components and assemblies described herein and changes may be made in the steps or sequence of steps described herein without departing from the spirit and scope of the invention as defined in the following claims.

What is claimed is:

1. An adjustable pattern adapted to be utilized with a cutting machine having a drive motor with a drive motor output shaft and a cutting element associated with the drive motor so the cutting element follows a cutting path generally following movement of the drive motor, the adjustable pattern comprising:
   a support post for connecting the adjustable pattern to the cutting machine;
   a first drive post having a drive end connectable to the drive motor of the cutting machine;
   a second drive post spaced a predetermined distance from the first drive post;
   means connecting the first and the second drive posts so that rotational movement of the first drive post rotatingly drives the second drive post; and
   means for selectively varying the distance between the first drive post and the center of the support post thereby selectively varying the cutting path diameter defined by the movement of the first drive post as the second drive post moves along a pattern path, the first drive post being rotatingly driven by the drive motor of the cutting machine.

2. The adjustable pattern of claim 1 defined further to include:
   a base pattern having a surface defining a pattern path; and
   means for movably connecting the second drive post to the surface of the base pattern defining the pattern path so the second drive post moves along the pattern path as the second drive post is rotated.

3. The adjustable pattern of claim 2 wherein the base pattern is generally circularly shaped having an outer peripheral surface of a predetermined diameter defining the pattern path, and wherein the cutting path is defined further as having a predetermined diameter determined by the distance between the center of the base pattern and first drive post.

4. The adjustable pattern of claim 3 wherein the base pattern is defined further as having an upper surface and a lower surface and wherein the adjustable pattern is defined further to include:
   a support base assembly having one portion movably connected to a central portion of the base pattern and a portion of the support base assembly extending a distance radially from the central portion of the base pattern for forming a rod support portion spaced a distance radially from the central portion of the base pattern;
   an adjust rod slidingly extending through the rod support portion of the support base and having one end connected to the first drive post, the adjust rod being slidingly movable within the rod support portion of the support base assembly in opposite directions to move the first drive post connected thereto to various, predetermined positions spaced predetermined distances radially from the central portion of the base pattern to varingly adjust the diameter of the cutting path; and
   means for securing the adjust rod at preselected positions within the rod support portion of the support base.

5. The adjustable pattern of claim 4 defined further to include:
   a bar having opposite ends, the first drive post extending through one end portion of the bar and the second drive post extending through the opposite end portion of the bar, the bar spacing the first and the second drive posts the predetermined distance apart and the first drive post being bearingly connected to the bar and the second drive post being bearingly connected to the bar.

6. The adjustable pattern of claim 5 defined further to include:
   means for biasing the means connected to the second drive post for movingly connecting the second drive post to the surface forming the base pattern toward and into engagement with the surface forming the base pattern.

7. The adjustable pattern of claim 5 wherein the means for drivingly connecting the first and the second drive posts is defined further to include:
   a first drive pulley secured to the first drive post;
   a second drive pulley secured to the second drive post; and
   means for drivingly connecting the first and the second drive pulleys so that rotation of the first drive pulley rotatingly drives the second drive pulley.

8. The adjustable pattern of claim 2 wherein the means for movingly connecting the second drive post to the surface of the base pattern defining the pattern path is defined further to include:
   a first drive ring connected to the second drive post and having an outer peripheral surface and having a predetermined diameter, a groove being formed in the outer peripheral surface of the first drive ring and the groove being shaped to receive a portion of the base pattern generally adjacent the outer peripheral surface so that the first drive ring is in driving engagement with the surface of the base pattern defining the pattern path;
   a second drive ring connected to the second drive post and having an outer peripheral surface and a predetermined diameter, the diameter of the second drive ring being smaller than the diameter of the first drive ring and a groove being formed in the outer peripheral surface of the second stop ring for receiving a portion of the base pattern generally adjacent the outer peripheral surface so that the second drive ring is in driving engagement with the surface of the base pattern defining the pattern path of the base pattern; and means for positioning one of the first and the second drive rings into an operating position wherein the outer peripheral surface pattern of the base pattern is operably positioned within the groove of one of the first and the second drive rings.

9. The adjustable pattern of claim 4 wherein the support base assembly is defined further to include:

a base plate having opposite ends;

means for movably connecting one end portion of the base plate to a central portion of the base pattern so that the base plate can be rotatingly moved about the central portion of the base pattern during the operation of the adjustable pattern; and a support base connected to the end portion of the base plate, opposite the end portion of the base plate movably connected to the central portion of the base pattern, the support base being positioned a predetermined distance radially from the central portion of the base pattern and the support base forming the rod support portion of the support base assembly, the support base having an opening extending therethrough and sized for slidingly receiving the adjust rod.

10. The adjustable pattern of claim 6 defined further to include:

means for securing the adjust rod at predetermined positions within the rod support portion of the support base assembly.

11. The adjustable pattern of claim 1 defined further to include:

a support base assembly having one portion movably connected to the support post and a portion of the support base assembly forming a rod support portion;

an adjust rod slidingly extending through the rod support portion of the support base and having one end connected to the first drive post, the adjust rod being slidingly movable within the rod support portion of the support base assembly in opposite directions to move the first drive post connected thereto to various, predetermined positions spaced predetermined distances radially from the support post to varingly adjust the diameter of the cutting path; and means for securing the adjust rod at preselected positions within the rod support portion of the support base.

12. The adjustable pattern of claim 11 defined further to include:

a bar having opposite ends, the first drive post extending through one end portion of the bar and the second drive post extending through the opposite end portion of the bar, the bar spacing the first and the second drive posts the predetermined distance apart and the first drive post being bearingly connected to the bar and the second drive post being bearingly connected to the bar.

13. The adjustable pattern of claim 12 wherein the means for drivingly connecting the first and the second drive posts is defined further to include:

a first drive pulley secured to the first drive post;

a second drive pulley secured to the second drive post; and means for drivingly connecting the first and the second drive pulleys so that rotation of the first drive pulley rotatingly drives the second drive pulley.

* * * * *